United States Patent [19]

Chu

[11] Patent Number: 4,927,525

[45] Date of Patent: * May 22, 1990

[54] CATALYTIC REFORMING WITH IMPROVED ZEOLITE CATALYSTS

[75] Inventor: Yung F. Chu, Plainsboro, N.J.

[73] Assignee: Mobil Oil Corporation, New York, N.Y.

[*] Notice: The portion of the term of this patent subsequent to May 22, 1990 has been disclaimed.

[21] Appl. No.: 238,677

[22] Filed: Aug. 30, 1988

[51] Int. Cl.$^5$ ............................................. C10G 35/06
[52] U.S. Cl. ........................................ 208/138; 208/65
[58] Field of Search ................................. 208/138, 65

[56] References Cited

U.S. PATENT DOCUMENTS

| Re. 31,919 | 6/1985 | Butter et al. | 502/66 |
|---|---|---|---|
| 4,076,842 | 2/1978 | Plank et al. | 423/328 |
| 4,623,632 | 11/1986 | Lambert et al. | 502/74 |
| 4,652,689 | 3/1987 | Lambert et al. | 585/415 |
| 4,694,114 | 9/1987 | Chu et al. | 585/481 |
| 4,699,708 | 10/1987 | Dessau | 208/111 |

Primary Examiner—Curtis R. Davis
Attorney, Agent, or Firm—Alexander J. McKillop; Charles J. Speciale; Howard M. Flournoy

[57] ABSTRACT

An improved zeolite catalyst containing at least one noble metal and at least one alkali metal wherein the amount of the latter component exceeds the cationic exchange capacity of the zeolite has been found to be highly useful for catalytic reforming.

18 Claims, 3 Drawing Sheets

CATALYTIC REFORMING WITH IMPROVED ZEOLITE CATALYSTS

This application is related to Ser. No. 238,678, filed concurrently, entitled "METHOD OF PRETREATING A NAPHTHA".

BACKGROUND OF THE INVENTION

This invention relates to an improved reforming catalyst comprising at least one noble metal and at least one alkali metal and to its use in catalytic reforming processes.

Catalytic reforming is a well known type of petroleum refinery operation which is employed to improved the octane rating of straight run gasolines. It involves converting maphtha fractions, i.e., paraffins which possess low octane ratings, to aromatics which possess high octane values. Hydrocarbon conversion reactions occurring during reforming include dehydrogenation of cyclohexanes to aromatics, dehydroisomerization of alkylcyclopentanes to aromatics, dehydrocyclization of acyclic hydrocarbons to aromatics, dealkylation of alkylbenzenes, isomerization of paraffins and hydrocracking reactions which produce light gaseous hydrocarbons such as methane, ethane, propane and butanes. Hydrocracking reactions are generally undesirable and should be minimized because they decrease the yield of gasoline boiling products.

There is a high demand for high octane gasoline for use as motor fuels and the like. Accordingly, much research is dedicated to the development of improved reforming catalysts and catalytic reforming processes. Zeolite catalysts have been found to be highly useful in reforming and other naphtha upgrading processes.

Zeolite Beta, for example, has been found to be suitable for use as a catalyst for hydrocracking naphtha under mild conditions, (U.S. Pat. No. 3,923,641). However, it has been found to be desirous to further treat such catalysts by steaming to improve their activity and their stability in acid catalyzed reactions. The catalysts used in hydrocracking and/or reforming processes generally contain platinum and high acidity zeolites but have poor $C_4^+$ and $C_5^+$ selectivity (U.S. Pat. No. 4,276,151). An example of a platinum-containing reforming catalyst is described in U.S. Pat. No. 4,456,527 which relates to a reforming process having selectivity for dehydrocyclization.

It has now been found that zeolite catalysts suitable for catalytic reforming can be further improved by adding at least one alkali metal in specific controlled amounts to the zeolite so that the $C_5^+$ gasoline losses are significantly reduced and the $C_4^+$ gasoline yields are increased. The catalyts described herein are different from those described in U.S. Pat. Nos. 3,783,123 and 4,478,706 which use alkali metal containing zeolite catalyts wherein the zeolites must be specially treated and have exchangeable cations/$AlO_2^- \leq 1$. Furthermore, unlike alkaline earth metal zeolite catalyts which are sensitive to sulfur (U.S. Pat. No. 4,456,527), the present catalysts are stable toward sulfur containing feeds.

It is therefore, an object of this invention to provide an improved reforming catalyst and to provide a process of using said catalyst which provides significantly higher $C_4^+$ gasoline yields than conventional reforming catalyts.

SUMMARY OF THE INVENTION

This invention is directed to zeolite catalyts containing at least one noble metal and one alkali metal useful for catalytic reforming. Zeolites useful include high silica/alumina zeolite beta, ZSM-23, and other similar ZSM-5 type zeolites. The noble metal loading should be in range of 0.1–1% weight, and the alkali metal loading should exceed the cationic exchange capacity of the zeolite component if the desirous improved process results are to be attained. The invention is also directed to a process of using such catalysts.

The present invention also relates to a method for reforming a naphtha which comprises contacting the naphtha with a noble metal/alkali metal-containing zeolite under reforming conditions whereby significantly higher $C_4^+$ (but slightly lower $C_5^+$) gasoline yields as compared to conventional reforming catalysts are obtained. Further the catalysts in accordance with the invention are sulfur resistant and eliminate the need for careful environmental (Chloride, $H_2O$) control.

DESCRIPTION OF PREFERRED EMBODIMENTS

Figure 1:
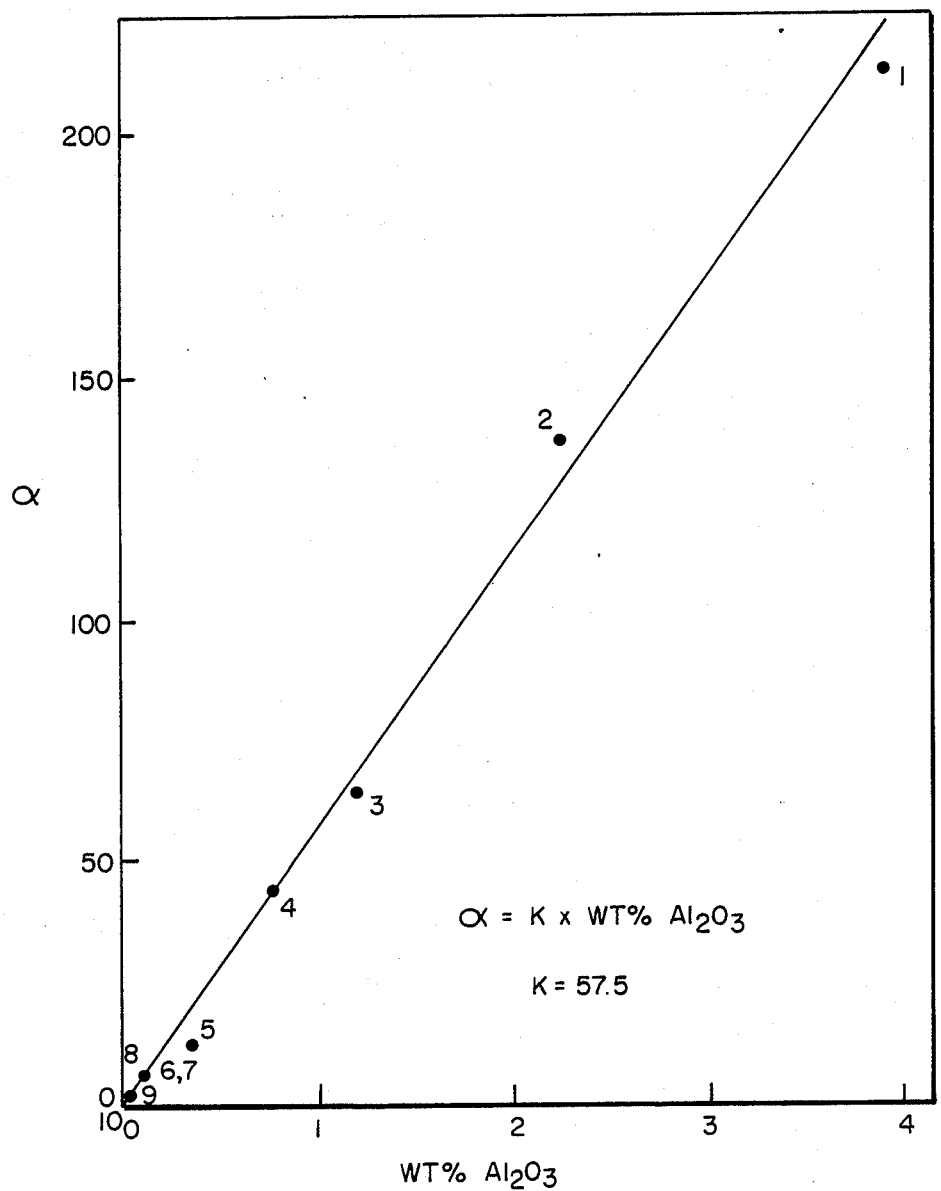
FIGS. 1 and 2 present the $C_4^+$ yield/octane and $C_5^+$ yield/octane performance, respectively, for noble metal/alkali metal-containing zeolite catalysts of the present invention as compared to conventional reforming catalysts.

In the present invention, the noble metals are generally selected from the group consisting of Pt, Ir, Os, Pd, Rh, and Ru, and preferably Pt. The alkali metal generally used is selected from the group consisting of Li, Na, K, Rb and preferably Li or K. The zeolites generally used in accordance with this invention are selected from such zeolites as Zeolite beta, ZSM-5 and ZSM 23 and other ZSM-5 type zeolites.

The crystalline zeolites utilized herein are members of a novel class of zeolitic materials which exhibit unusual properties. Although these zeolites have unusually low alumina contents, i.e. high silica to alumina mole ratios, they are very active even when the silica to alumina mole ratio exceeds 30. The activity is surprising, since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts, generally have low coke-forming activity and therefore are conducive to long times on stream between regenerations by burning carbonaceous deposits with oxygen-containing gas such as air.

An important characteristic of the crystal structure of this novel class of zeolites is that it provides a selective constrained access to and egress from the intracrystalline free space by virtue of having an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina mole ratio of a least 12 are useful, it is preferred in some instances to use zeolites having much higher silica to aluminum mole ratios, i.e. 1600 and above. In addition, zeolites as otherwise characterized herein but which are substantially free of aluminum, i.e. having silica to alumina mole ratios up to infinity, are found to be useful and even preferable in some instances. Such "high silica" or "highly siliceous" zeolites are intended to be included within this description. Also to be included in this definition are the pure silica analogs of the useful zeolites of this invention, i.e. having absolutely no aluminum (silica to alumina mole ratio of infinity).

The novel class of zeolites useful herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolites is not of the desired type. Windows of 10-membered rings are preferred, although in some instances excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons and, therefore, it is not the present invention to entirely judge the usefulness of a particular zeolite solely from theoretical structural considerations.

Rather than attempt to judge from crystal structure whether or not a zeolite possesses the necessary constrained access to molecules of larger cross-section than normal paraffins, a simple determination of a "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1004° F. (540° C.) for at least 15 minutes. The zeolite is then flushed with helium and the temperature is adjusted between 554° F. (290° C.) and 950° F. (510° C.) to give an overall conversion of between 10% and 60%. The mixture of hydrocarbons is passed at 1 liquid hourly space velocity (i.e., 1 volume of liquid hydrocarbons per volume of zeolite per hour) over the zeolite with a helium dilution to give a helium to (total) hydrocarbon mole ratio of 4:1. After 20 minutes on steam, a sample of the effluent is taken and analyzed, most conveniently by gas chromatography, to determine the fraction remaining unchanged for each of the two hydrocarbons.

While the above experimental procedure will enable one to achieve the desired overall conversion of 10 to 60% for most zeolite samples and represents preferred conditions, it may occassionally be necessary to use somewhat more severe conditions for samples of very low activity, such as those having an exceptionally high silica to alumina mole ratio. In those instances, a temperature of up to about 1004° F. (540° C.) and a liquid hourly spaced velocity of less than one, such as 0.1 or less, can be employed in order to achieve a minimum total conversion of about 10%.

There also may be instances where the activity is so low, e.g. silica to alumina mole ratio approaching infinity, that the Constraint Index cannot be adequately measured, if at all. In such situations, Constraint Index is meant to mean the Constraint Index of the exact same substance, i.e., same crystal structure as determined by such means as x-ray diffraction pattern, but in a measurable form, e.g., high aluminum containing form.

The "Constraint Index" is calculated as follows:

Constraint Index =

$$\frac{\text{Log}_{10} \text{ (fraction of hexane remaining)}}{\text{Log}_{10} \text{ (fraction of 3-methylpentane remaining)}}$$

The Constraint Index approximates the ratio of the cracking rate constants for the two hydrocarbons. Zeolites suitable for the present invention are those having a Constraint Index (C.I.) in the approximate range of 1 to 12. Constraint Index values for some typical catalysts, including those useful herein, are:

|  | C.I. | (at test Temperature) |
|---|---|---|
| ZSM-4 | 0.5 | (316° C.) |
| ZSM-5 | 6–8.3 | (316° C.–371° C.) |
| ZSM-11 | 5–8.7 | (316° C.–371° C.) |
| ZSM-12 | 2.3 | (316° C.) |
| ZSM-22 | 7.3 | (427° C.) |
| ZSM-23 | 9.1 | (427° C.) |
| ZSM-35 | 4.5 | (454° C.) |
| ZSM-48 | 3.5 | (538° C.) |
| TMA Offretite | 3.7 | (316° C.) |
| Clinoptilolite | 3.4 | (510° C.) |
| Beta | 0.6–2.0 | (316° C.–399° C.) |
| H-Zelon (Mordenite) | 0.5 | (316° C.) |
| REY | 0.4 | (316° C.) |
| Amorphous Silica-Alumina | 0.6 | (538° C.) |
| Erionite | 38 | (316° C.) |

The above-described Constraint Index is an important and even critical definition of those zeolites which are useful in the instant invention. The very nature of this parameter and the recited technique by which it is determined however, admit of the possibility that a given zeolite can be tested under somewhat different conditions and thereby exhibit different Constraint indices. Constraint Index seems to vary somewhat with severity of operation (conversion) and the presence of absence of binders. Likewise, other variables such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular zeolite. This explains the range of Constraint Indices for some zeolites, such as ZSM-5, ZSM- 11 and Beta. Such zeolites exhibit the contrained access as herein defined and are to be regarded as having a Constraint Indices in the range of 1 to 12. Also contemplated herein as having a Constraint Index in the range of 1 to 12 and therefore within the scope of the defined novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value within the range of 1 to 12. Thus, it should be understood that the Constraint Index value as used herein is an inclusive rather than an exclusive valve. That is, a crystalline zeolite when identified by any combination of conditions within the testing definition set forth herein as having a Constraint Index in the range of 1 to 12 is intended to be included in the instant novel zeolite definition whether or not the same identical zeolite, when tested under other of the defined conditions, may give a Constraint Index value outside of the range of 1 to 12.

The novel class of zeolite defined herein is exemplified by ZSM-5, ZSM-11, ZSM-12, ZSM-22, ZSM-23, ZSM-35, ZSM-48, Zeolite beta and other similar materials or hydrogen forms thereof.

ZSM-5 described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,82,449. That description, and in particular the X-ray diffraction pattern disclosed therein, is incorporated herein by reference.

ZSM-22 is more fully described in U.S. Pat. No. 4,694,114 which is incorporated in its entirety by reference thereto.

ZSM-23 is described in U.S. Pat. No. 4.076,842. The entire contents thereof, particularly the specification of the X-ray diffraction pattern of the disclosed zeolite, is incorporated herein by reference.

The ZSM-23 composition can also be identified in terms of mole ratios of oxides and in the anhydrous state, as follows:

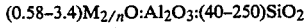

$(0.58-3.4)M_{2/n}O:Al_2O_3:(40-250)SiO_2$ wherein M is at least one cation and n is the valence thereof. It will be noticed that the ratio of $M_{2/n}O$ may exceed unity in this material. This is probably due to the occlusion of excess organic species, used in the preparation of ZSM-23, within the zeolite pores.

In a preferred synthesized form, the zeolite has a formula, in terms of mole ratios of oxides and in the anhydrous state, as follows:

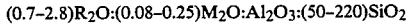

$(0.7-2.8)R_2O:(0.08-0.25)M_2O:Al_2O_3:(50-220)SiO_2$ wherein R is a nitrogen-containing organic cation, such as, for example, that derived from pyrrolidine and M is an alkali metal cation, especially sodium.

Synthetic ZSM-23, when employed either as an adsorbent or as a catalyst in a hydrocarbon conversion process, should be dehydrated at least partially. This can be done by thermal treatment, i.e. heating, to a temperature in the range of 50° C. to about 900° C. in an inert temperature, such as air, nitrogen, etc. and at atmospheric or subatmospheric pressures for between 1 and 48 hours. Dehydration can also be performed at lower temperature merely be placing the catalyst in a vacuum, but a longer time is required to obtain a sufficient amount of dehydration.

ZSM-35 is described in U.S. Pat. No. 4.016,245. The description of that zeolite, and particularly the X-ray diffraction pattern thereof, is incorporated herein by reference.

ZSM-48 is described in U.S. Pat. No. 4,397,827 and is incorporated herein by reference. The composition ZSM-48 can be identified, in terms of moles of anhydrous oxides per 100 moles of silica, as follows:

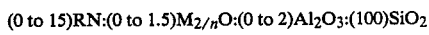

$(0 \text{ to } 15)RN:(0 \text{ to } 1.5)M_{2/n}O:(0 \text{ to } 2)Al_2O_3:(100)SiO_2$ wherein M is at least one cation having a valence n, RN is a $C_1$-$C_{20}$ organic compound having at least one amine functional group of $pK_{alpha}=7$, and wherein the composition is characterized by distinctive X-ray diffraction pattern.

Zeolite beta is more fully described in U.S. Pat. Nos. 3,308,069 and Re 28,341, to which reference is made for further details of this zeolite, its preparation and properties. The composition of zeolite beta in one of its synthesized forms is as follows; on an anhydrous basis:

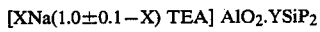

$[XNa(1.0\pm0.1-X) \text{ TEA}] AlO_2.YSiP_2$ wherein X is less than 1, preferably less than 0.75; TEA represents the tetraethylammonium ion; Y is greater than 5 but less than 100. In the as-synthesized form, water of hydration may also be present in ranging amounts.

The sodium is derived from the synthesis mixture used to prepare the zeolite. This synthesis mixture contains a mixture of the oxides (or of materials whose chemical compositions can be completely represented as mixtures of the oxides) $Na_2O$, $Al_2O_3$, $[C_2H_5)_4N]_2O$, $SiO_2$ and $H_2O$. The mixture is held at a temperature of about 75° C. to 200° C. until crystallization occurs. The composition of the reaction mixture expressed in terms of mole ratios, preferable falls within the following ranges:

$SiO_2/Al_2O_3$—10 to 200
$Na_2O$/tetraethylammonium hydroxide (TEAOH)—0.0 to 0.1
$TEAOH/SiO_2$—0.1 to 1.0
$H_2O/TEAOH$—20 to 75

The product which crystallizes from the hot reaction mixture is separated, e.g., by centrifuging or filtration, washed with water and dried. The material so obtained may be calcined by heating in air in an inert atmosphere at a temperature usually within the range of 200° C. to 900° C., or higher. This calcination degrades the tetraethylammonium ions to hydrogen ions and removes substantially all the water. The formula of the zeolite is then:

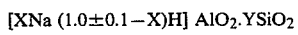

$[XNa (1.0\pm0.1-X)H] AlO_2.YSiO_2$ wherein X and Y have the values ascribed to them above. The degree of hydration is here assumed to be zero, following the calcination.

In a preferred aspect of this invention, the zeolites hereof are selected as those providing among other things a crystal framework density, in the dry hydrogen form, of not less than about 100 lbs. per cubic foot (1.6 gram per cubic centimeter). It has been found that zeolites which satisfy all three of the discussed criteria are most desired for all several reasons. When hydrocarbon products or by-products are catalytically formed, for example, such zeolites tend to maximize the production of gasoline boiling range hydrocarbon products. Therefore, the preferred zeolites useful with respect to this invention are those having a Constraint Index as defined above of about 1 to 12, a silica to alumina mole ratio of at least about 12 and a dried crystal density of not less than about 1.6 grams per cubic centimeter. The dry density for known structures may be calculated from the number of silicon plus aluminum atoms per 1000 cubic Angstroms, as given e.g. on page 19 of the article ZEOLITE STRUCTURE by W. M. Meier. This paper, the entire contents of which are incorporated herein by reference, is included in PROCEEDINGS OF THE CONFERENCE ON MOLECULAR SIEVES (London, April 1967) published by the Society of Chemical Industry, London, 1968.

As is the case of many catalysts, it is desired to incorporate the zeolite with another material resistant to the temperatures and other conditions employed in organic conversion processes. Such materials include active and inactive materials as well as inorganic material such as clays, silica and/or metal oxides. Inactive materials suitably serve as diluents to control the amount of conversion in a given process to that products can be obtained economically and orderly without employing other means for controlling the ratio of reaction.

Binders useful for composition with the useful zeolite herein also include inorganic oxides, notably alumina, which is particularly preferred.

In addition to the foregoing materials, the zeolite catalyst can be composited with a porous matrix material such as silica-alumina, silica-magnesia, silica-zirconia, silica-thoria, silica-beryllia, silica-titania as well as ternary composition such as silica-alumina-thoria, silica-alumina-zirconia, silica-alumina-magnesia and silica-magnesia-zirconia. The relative proportions of finely divided crystalline zeolite and inorganic oxide matrix vary widely with the zeolite content ranging from about 1 to about 90 percent by weight and more usually in the range of about 2 to about 50 percent by weight of the composite.

It may be preferred to use a catalyst of controlled acid activity in many processes and process conditions embraced by the present invention. This controlled acid activity of the catalyst is attainable in any of several ways or a combination of these. A preferred method to reduce activity is to form the zeolite at high silica to alumina mole ratio above 200, preferably above 500. Very high dilution with an inert matrix is also effective. For example, composites of a more active form of zeolite ZSM-5 with alumina at a ratio of 5 parts of zeolite with 95 parts of the inert matrix provide a suitable catalyst as described in U.S. Pat. No. 4,152,363, the entire contents of which are incorporated herein by reference.

Activity of these zeolites may also be reduced by thermal treatment or steam at high temperature as described in U.S. Pat. Nos. 3,965,209 and 4,016,218, the entire contents of which are incorporated by reference herein.

Preferably, the catalyst of the present invention is prepared by compositing the as-synthesized zeolite with the binder and the resulting composite is extruded, dried and then calcined. After calcination the composite is ammonium-exchanged, thereafter metal ion-exchanged, dried and then calcined.

The metal may be incorporated into the catalyst by any suitable method such as impregnation or exchanged onto the zeolite. The metal may be incorporated in the form of a cationic, anionic or neutral complex such as $Pd(NH_3)_4{}^{2+}$ or $Pt(NH_3)_4{}^{2+}$ or alkali metal or a mixtures of alkali and noble metal. Cationic complexes of this type will be found particularly convenient for exchanging metals onto the zeolite. The amount of the metal components is suitably from 0.01 to 10 percent by weight, normally 0.1 to 5 percent by weight of the catalyst, although this will, of course, vary with the nature of the component. The amount, however, must be carefully controlled so that the amount of alkali metal exceeds the cationic exchange capacity of the zeolite. The resulting catalyst may be mildly steamed, if desired, to enhance catalyst stability.

The catalyst of this invention may be prepared in any desired physical form. Preferably, it is used in the form of small fragments of a size best suited for operation under the specific conditions existing. Thus, the catalyst may be in the form of finely divided powder or may be in the form of pellets of 1/16 inch to ⅛ inch size, for example. The catalyst can be obtained by pelleting, casting, or extruding in accordance with well known techniques.

The reforming process using Zeolite beta, for example, can be run under a variety of conditions. The pressure may vary from 0 to 2,000 psig, but will preferably be from about 100 to about 800 psig. The temperature of reaction is preferably from about 850° to about 1000° F., but may range from about 750° to about 1200° F. The hydrogen to hydrocarbon ratio, in a mole basis, can run from 1 to 1 to about 15 to 1, preferably from about 3 to 1 to about 7 to 1. Weight hour space velocities (WHSV) may be from about 0.5 to about 20, preferably from about 1 to about 3.

The invention is illustrated by the following Examples which are not meant as limiting the claimed invention in any way.

EXAMPLES 1-6: CATALYST PREPARATIONS

The catalysts tested are all extrudates made by mulling and extruding 65% Kaiser alumina and ~35% zeolite with ~50% distilled water. The extrudates are $N_2$ precalcined by heating in flowing $N_2$ from room temperature to 1000° F. at a rate of 5° F.min and kept at the final temperature for three hours. The catalysts are then ammonium exchanged, $N_2$ precalcined again, and then air calcined at 1000° F. for three hours. The acid form extrudates are steamed if desired, followed by Pt and alkali metal impregnation, and a final air calcination at 900° F. for three hours. The composition of the catalysts are given in Table 1.

EXAMPLES 7-11: CATALYST RESULTS

The composition of the feed, Arab light raw naphtha, is given in Table 2. The test conditions and results are shown in Tables 3.1-3.5.

Figure 2:
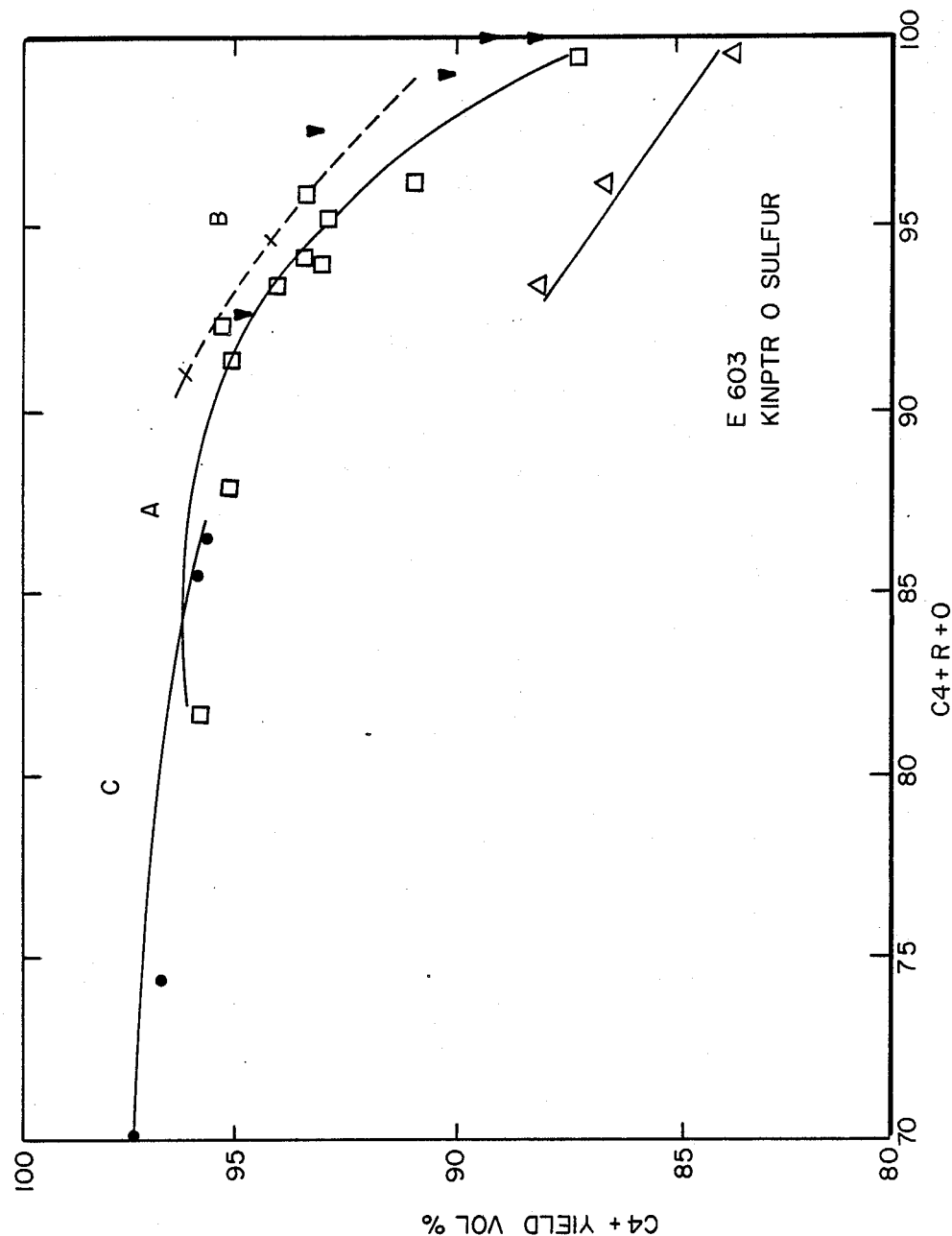
Figure 3:
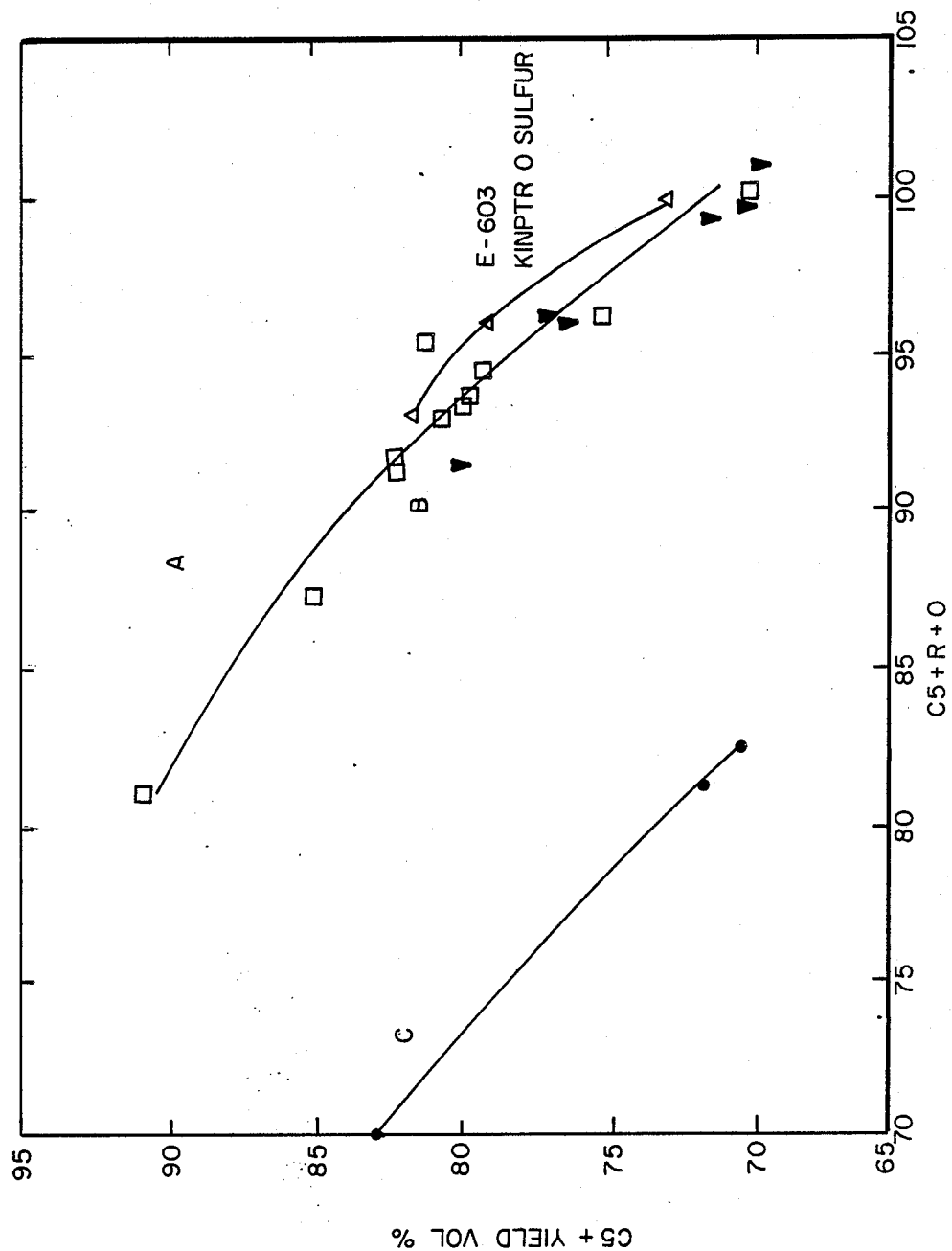
FIG. 3 presents the effect of alkali metal content on the reforming performance of Pt-zeolite beta.

Examples 7-9 and FIGS. 1 and 2 show the importance of alkali metal loading. It is clear that catalyst C which has $Li^+/AlO_2{}^- < 1$ and lower $C_5{}^4$ yields is inferior to catalysts A and B which have $Li^+/AlO_2{}^- > 1$, even though catalyst A has not been pre-steamed. The selectivity advantage of the latter catalysts are apparently due to the higher alkali metal contents, $Li^+/AlO_2^- > 1$, which presumably suppresses hydrocracking while enhancing the more important dehydrocyclization and dehydrogenation (i.e. naphthenes to aromatics) reactions (see FIG. 3). Like the $Li^+/AlO_2^- > 1$ catalyst (C), the Pt/Zeolite beta catalyst (F) which has been severely pre-steamed to 6 alpha but contains no alkali metal shows poor selectivity.

FIGS. 1 and 2 also show that the present catalysts have higher $C_4^+$ and lower $C_5^+$ gasoline yields than those estimated for conventional bimetallic reforming catalysts (e.g. $Pt-Re/Al_2O_3$). In addition, it is known that the conventional reforming catalysts cannot process high-sulfur containing feeds. A detailed comparison of the performance of the two catalyst systems is given in Table 4. The example catalyst produces significantly lower (e.g. 4% wt) $C_1+C_2$ and higher $iC_4$ and $nC_4$ (e.g. 6 and 4% vol, respectively) compared with the conventional reforming catalyst, even though the $C_5^+$ yield is about 3% volume lower.

Examples 10–11 show that useful zeolites are not limited to larger pore Zeolite beta only, since both Pt-ZSM-5 and ZSM-23 catalysts are also suitable.

The present catalyst system has the advantage of higher $C_4^+$ and lower $C_1+C_2$ yields than the conventional reforming catalysts, which is important in refineries where $iC_4$ supply is limited. The catalysts are sulfur resistant and are therefore also useful in the reforming of sulfur containing feedstocks without expensive pre-treatment. Furthermore, since no chloride injection is used, there is no need for careful environmental (chloride, $H_2O$) control as noted supra.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

TABLE 1
CATALYST COMPOSITIONS

| | Examples No. | | | | | |
|---|---|---|---|---|---|---|
| | 1 | 2 | 3 | 4 | 5 | 6 |
| | A | B | C | D | E | F |
| Zeolite Type | beta | beta | beta | ZSM-5 | ZSM-23 | beta |
| $SiO_2/Al_2O_3$ | 37 | 37 | 37 | 70 | 80 | 37 |
| Steaming | No | Yes | Yes | Yes | Yes | Yes |
| alpha* | 325 | 55 | 55 | 40 | 46 | 6 |
| Equivalent Al**, wt % $Al_2O_3$ | 4 | 1 | 1 | 1 | | 0.1 |
| Pt, wt % | 0.6 | 0.6 | 0.6 | 0.6 | 0.6 | 0.6 |
| Li, wt % | 1.0 | 0.6 | 0.3 | — | — | — |
| K, wt % | — | — | — | 2 | 2 | — |
| $Li^+/AlO_2^-$, mole ratio | 1.8 | 1.1 | 0.5 | — | — | 0 |
| $K^+/AlO_2^-$, mole ratio | — | — | — | 2.6 | — | 0 |

*Alpha value is a measure of the catalyst acid activity for n-hexane cracking. The alpha test is found described in a letter to the editor, entitled "Superactive Crystalline Aluminosilicate Hydrocarbon Cracking Catalysts," by P. B. Weisz and J. N. Miale, Journal of Catalysis, Volume 4, pages 527–529 (August 1965) and in U.S. Pat. No. 3,354,078.

**The framework Al is estimated from the alpha value based on a correlation developed for ZSM-5 which is assumed to be applicable to Zeolite beta.

TABLE 2
FEED COMPOSITION
Arab Light Raw Naphtha

| | |
|---|---|
| B.P. °F. | 220–350 |
| S, ppm | 380 |
| API Gravity | 57.4 |
| Paraffins, wt % | 58.2 |
| Naphthenes, wt % | 28.1 |
| Aromatics, wt % | 13.7 |

TABLE 3.1
CATALYST PERFORMANCE

| Example No. | 7 | | |
|---|---|---|---|
| Catalyst I.D. | A | | |
| Conditions | | | |
| Temp., °F. | 890 | 940 | 890 |
| WHSV | 4 | 2 | 1 |
| HOS | 19 | 161 | 280 |
| Results | | | |
| $C_4^+$ Yield, vol % | 92 | 98 | 97 |
| RON + 0 | 95 | 91 | 93 |
| $C_5^+$ Yield, vol % | 79 | 71 | 76 |
| RON + 0 | 91 | 98 | 97 |
| $C_1 + C_2$, wt % | 0.2 | 1.1 | 0.6 |
| $C°_3$, wt % | 4.8 | 7.9 | 5.6 |

N.B. All experiments at 200 psig, 5/1 $H_2$/HC

TABLE 3.2
CATALYST PERFORMANCE

| Example No. | 8 | | | |
|---|---|---|---|---|
| Catalyst I.D. | B | | | |
| Conditions | | | | |
| Temp., °F. | 890 | 890 | 920 | 940 |
| WHSV | 2 | 1 | 1 | 1 |
| HOS | 24 | 41 | 65 | 73 |
| Results | | | | |
| $C_4^+$ Yield, vol % | 96 | 95 | 92 | 91 |
| RON + 0 | 91 | 96 | 99 | 98 |
| $C_5^+$ Yield, vol % | 82 | 78 | 73 | 71 |
| RON + 0 | 90 | 95 | 98 | 99 |
| $C_1 + C_2$, wt % | 0.2 | 0.4 | 0.8 | 1.2 |
| $C°_3$, wt % | 4.1 | 4.8 | 7.3 | 7.8 |

N.B. All experiments at 200 psig, 5/1 $H_2$/HC

TABLE 3.3
CATALYST PERFORMANCE

| Example No. | 9 | | | | |
|---|---|---|---|---|---|
| Catalyst I.D. | C | | | | |
| Conditions | | | | | |
| Temp., °F. | 890 | 890 | 920 | 940 | 940 |
| WHSV | 2 | 1 | 4 | 4 | 2 |
| HOS | 7 | 23 | 47 | 55 | 96 |
| Results | | | | | |
| $C_4^+$ vol % | 96 | 97 | 99 | 98 | 97 |
| RON + 0 | 87 | 86 | 69 | 70 | 73 |
| $C_5^+$ Yield, vol % | 70 | 72 | 87 | 85 | 83 |
| RON + 0 | 82 | 81 | 66 | 66 | 69 |
| $C_1 + C_2$, wt % | 0.9 | 1.2 | 0.7 | 0.9 | 1.8 |
| $C°_3$, wt % | 10.8 | 9.7 | 4.7 | 5.8 | 6.2 |

N.B. All experiments at 200 psig, 5/1 $H_2$/HC

TABLE 3.4
CATALYST PERFORMANCE

| Example No. | 10 | | | |
|---|---|---|---|---|
| Catalyst I.D. | D | | | |
| Conditions | | | | |
| Temp., °F. | 890 | 920 | 940 | 980 |
| WHSV | 2 | 1 | 1 | 1 |
| HOS | 25 | 41 | 64 | 82 |
| Results | | | | |
| $C_4^+$ Yield, vol % | 96 | 94 | 91 | 87 |

TABLE 3.4-continued

CATALYST PERFORMANCE

| RON + 0 | 75 | 85 | 88 | 95 |
|---|---|---|---|---|
| $C_5^+$ Yield, vol % | 92 | 87 | 81 | 75 |
| RON + 0 | 74 | 84 | 87 | 95 |
| $C_1 + C_2$, wt % | 0.3 | 1.3 | 2.5 | 4.2 |
| $C^\circ_3$, wt % | 1.4 | 3.1 | 5.5 | 6.7 |

N.B. All experiments at 200 psig, 5/1 $H_2$/HC

TABLE 3.5

CATALYST PERFORMANCE

| Example No. | | | 11 | |
|---|---|---|---|---|
| Catalyst I.D. | | | E | |
| Conditions | | | | |
| Temp., °F. | 890 | 920 | 926 | 960 |
| WHSV | 2 | 2 | 1 | 1 |
| HOS | 161 | 168 | 233 | 252 |
| Results | | | | |
| $C_4^+$ Yield, vol % | 96 | 93 | 94 | 91 |
| RON + 0 | 78 | 83 | 88 | 93 |
| $C_5^+$ Yield, vol % | 91 | 86 | 85 | 80 |
| RON + 0 | 77 | 82 | 87 | 92 |
| $C_1 + C_2$, wt % | 0.3 | 0.5 | 1.2 | 1.7 |
| $C^\circ_3$, wt % | 2.0 | 3.0 | 3.8 | 5.5 |

N.B. All experiments at 200 psig, 5/1 $H_2$/HC

TABLE 4

Comparison of Pt/Li Zeolite Beta/Al2O3 and Conventional Bimetallic Reforming Catalysts

| Catalyst | Pt-Re/Al$_2$O$_3$* | Pt/Li Zeolite beta/Al$_2$O$_3$ (Catalyst A of Example 1) |
|---|---|---|
| Feed,** S ppm | — | 300 |
| Temp., °F. | 890 | 930 |
| $C_5^+$ Yield, vol % | 72.7 | 70.0 |
| RON + 0 | 100 | 99.3 |
| $C_4^+$ Yield, vol % | 83.7 | 91.0 |
| RON + 0 | 99.6 | 98.9 |
| $C_1 + C^\circ_2$, wt % | 5.4 | 1.4 |
| $C_3$, wt % | 6.7 | 7.7 |
| $iC_4$, vol % | 3.8 | 10.1 |
| $nC_4$, vol % | 7.2 | 10.9 |
| $H_2$ Prod. SCF/B | 853 | 600 |

*Pt-Re/Al$_2$O$_3$ conventional reforming catalyst octanes and yields are estimated based on a kinetic reforming model.
**Arab Light Raw Naphtha

I claim:

1. A method for reforming a naphtha which comprises contacting said naphtha with a noble metal/alkali metal-containing zeolite naphtha reforming catalyst said catalyst containing from about 0.1–1.0 wt % of said noble metal and an amount of said alkali metal which exceeds the cationic exchange capacity of said zeolite, a pressure of from about 0 to about 2000 psig, a temperature of about 750° F. to about 1200° F., a hydrogen to hydrocarbon molar ratio of about 0.1 to 1 to about 15 to 1 and a weight hourly spaced velocity of about 0.5 to about 20, whereby naphtha reforming activity of said catalyst is enhanced by said zeolite resulting in significantly improved $C_4^+$ gasoline yields.

2. The method of claim 1 wherein said noble metal is selected from the group consisting of Pt, Ir, Os, Pd, Rh and Ru or mixtures thereof.

3. The method of claim 1 wherein said noble metal comprises Pt.

4. The method of claim 1 wherein said noble metal comprises Pd.

5. The method of claim 1 wherein said alkali metal is selected from the group consisting of lithium, sodium, potassium, rubidium, and cesium or mixtures thereof.

6. The method of claim 1 wherein said alkali metal comprises lithium.

7. The method of claim 1 wherein said alkali metal comprises cesium.

8. The method of claim 1 wherein said catalyst is subjected to mild steaming to enhance naphtha catalyst stability.

9. The method of claim 1 wherein said pressure ranges from about 100 to about 800 psig, said temperature ranges from about 850° to 1000° F., said hydrogen to hydrocarbon molar ratio ranges from about 3 to 1 to about 7 to 1 and said weight hourly space velocity ranges from about 1 to about 3.

10. The method of claim 1 wherein said catalyst contains an inorganic oxide binder.

11. The method of claim 10 wherein said inorganic oxide binder is selected from the group consisting of alumina, silica and silica-alumina.

12. The method of claim 10 wherein said inorganic oxide binder is alumina.

13. The mixture of claim 1 wherein said naphtha is a $C_4^+$ naphtha.

14. The method of claim 1 wherein said naphtha is a $C_5^+$ naphtha.

15. The method of claim 1 wherein said naphtha is a $C_6^+$ naphtha.

16. The method of claim 1 wherein said zeolite is selected from the group consisting of ZSM-5, ZSM-11, ZSM-12, ZSM-22, ZSM-23, ZSM-35, ZSM-48 and mixtures thereof or their hydrogen forms.

17. A method for reforming a $C_4^+$ naphtha comprising contacting said naphtha with a Pt-containing Li-Zeolite beta naphtha reforming catalyst having an alumina binder, at a pressure ranging from about 100 to about 800 psig, a temperature ranging from about 850° to 1000° F., a hydrogen to hydrocarbon molar ratio of from about 3 to 1 to about 7 to 1 and a weight hourly space ratio (WHSV) ranging from about 1 to 3, whereby naphtha reforming activity of said catalyst is particularly enhanced by controlling the amount of alkali metal therein.

18. The method of claim 16 wherein said catalyst is mildly steamed to enhance the naphtha reforming catalyst's stability.

* * * * *